W. C. MARTINEAU.
CARD RECORD CARD.
APPLICATION FILED JUNE 10, 1907.

930,488. Patented Aug. 10, 1909.

Witnesses

Inventor
William C. Martineau
by Frederick W. Cameron
Attys.

UNITED STATES PATENT OFFICE.

WILLIAM C. MARTINEAU, OF ALBANY, NEW YORK.

CARD-RECORD CARD.

No. 930,488.  Specification of Letters Patent.  Patented Aug. 10, 1909.

Application filed June 10, 1907. Serial No. 378,105.

*To all whom it may concern:*

Be it known that I, WILLIAM C. MARTINEAU, a citizen of the United States, residing at the city of Albany, in the county of Albany and State of New York, have invented certain new and useful Improvements in Card-Record Cards, of which the following is a specification.

Figure 1:
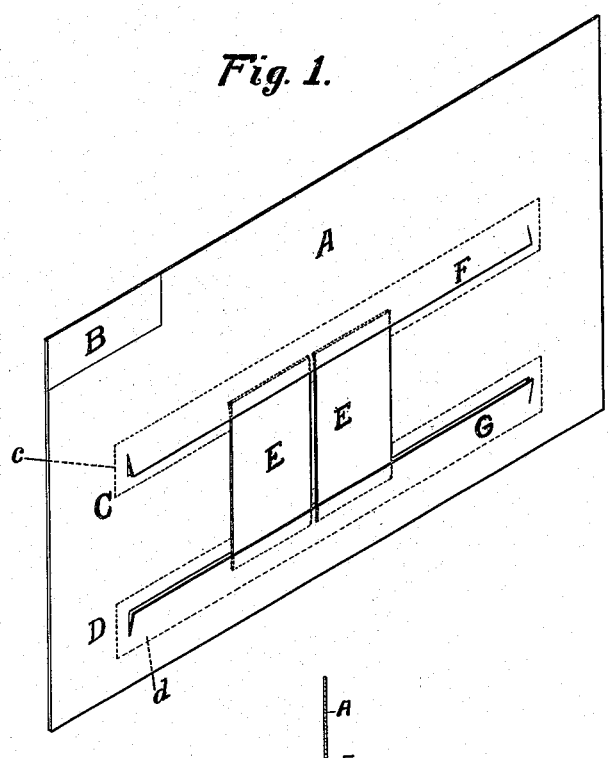
Figure 2:
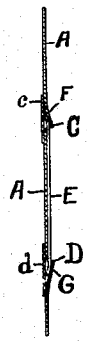

My invention relates to card records, and the object of my invention is to provide a means for using one or more tickets conjointly with a card record card to achieve greater convenience and perfection in recording of certain matter or information, in later reference thereto, and preserving said information. I attain this object by means of the mechanism illustrated in the accompanying drawing, in which:

Figure 1 is a perspective view. Fig. 2 is a transverse section.

Similar letters refer to similar parts throughout the several views.

A card record card usually contains article or subject or class or material name and detail. In the case of prices of goods it is desired at times to change the prices and terms, by writing on the card, until the assigned space is filled, when the matter may be erased, securing fresh space, but destroying information that was recorded.

By my invention I provide a card and in connection therewith use removable tickets, upon which changing things are put. As a succeeding change follows, a ticket is moved along to the right; when the space arranged has been filled, tickets are removed, one as one new ticket is added; and it is the intention to conveniently file removed tickets for future examination.

In the drawing, A represents an ordinary card having thereon in any desired location, as at B, the record subject. It being understood that upon the card such indications of a permanent character as are convenient may be printed (not shown). Through the card I make two parallel incisions, C, D, and at each end of each incision I make a short incision at right angles thereto, thus forming the tongues, F and G, and on the back of the card, in the rear of each of these incisions, I preferably paste, or otherwise secure, the strips, c, d, respectively.

I place the tickets, E, in connection with the card, A, by inserting one end through the incision, C, and the other through the incision, D. The tickets, E, will thus be held securely in position, and they may be moved from one end to the other of the incisions C and D and removed from contact therewith when desired. The tickets are readily introduced and removed because of the tongues F and G.

My invention may be applied to other cards than card records or card indices, for instance it is applicable to leaves or pages in so-called loose leaved ledger books, and in fact in any place where it is desirable to indicate constantly changing values or information.

What I claim as my invention and desire to secure by Letters Patent is:

A record card; two parallel tongues formed on said card; a retaining piece placed on the back of the card under each tongue; an adjustable ticket having its ends engaged by said tongues.

In testimony whereof I have affixed my signature in presence of two witnesses.

WILLIAM C. MARTINEAU.

Witnesses:
DENIS J. FOGARTY,
WM. F. RATHBONE.